United States Patent
Endo et al.

(10) Patent No.: US 8,350,897 B2
(45) Date of Patent: Jan. 8, 2013

(54) IMAGE PROCESSING METHOD AND IMAGE PROCESSING APPARATUS

(75) Inventors: Takaaki Endo, Urayasu (JP); Taichi Matsui, Yokohama (JP); Hideo Noro, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1168 days.

(21) Appl. No.: 11/909,236

(22) PCT Filed: Apr. 19, 2006

(86) PCT No.: PCT/JP2006/308680
§ 371 (c)(1),
(2), (4) Date: Sep. 20, 2007

(87) PCT Pub. No.: WO2006/115261
PCT Pub. Date: Nov. 2, 2006

(65) Prior Publication Data
US 2009/0051758 A1    Feb. 26, 2009

(30) Foreign Application Priority Data
Apr. 21, 2005 (JP) ................................ 2005-123980

(51) Int. Cl.
*H04N 9/47* (2006.01)
(52) U.S. Cl. ............. 348/53; 345/633; 600/595; 463/30
(58) Field of Classification Search ............ 348/53; 345/633; 600/595; 463/30
See application file for complete search history.

(56) References Cited

U.S. PATENT DOCUMENTS

| | | | |
|---|---|---|---|
| 6,956,503 B2 | 10/2005 | Yokokohji et al. | |
| 7,070,571 B2 | 7/2006 | Kramer et al. | |
| 7,095,422 B2 | 8/2006 | Shouji | |
| 7,259,771 B2 | 8/2007 | Shouji | |
| 7,423,553 B2 | 9/2008 | Yokokohji et al. | |
| 7,646,394 B1* | 1/2010 | Neely et al. | 345/633 |
| 2003/0083596 A1* | 5/2003 | Kramer et al. | 600/595 |
| 2003/0142115 A1 | 7/2003 | Endo et al. | 345/633 |
| 2005/0116964 A1 | 6/2005 | Kotake et al. | 345/629 |
| 2005/0179617 A1 | 8/2005 | Matsui et al. | 345/7 |
| 2006/0221098 A1 | 10/2006 | Matsui et al. | 345/633 |
| 2007/0006091 A1 | 1/2007 | Sakagawa et al. | 715/771 |

FOREIGN PATENT DOCUMENTS

| | | |
|---|---|---|
| JP | 2005-063004 | 3/2005 |
| JP | 2005-083826 A | 3/2005 |
| WO | 03/063086 A1 | 7/2003 |

OTHER PUBLICATIONS

Nunomaki (("Multi-part Non-rigid Object Tracking Based on Time Model-Space Gradients", Jan. 2000) X-reference.*

(Continued)

*Primary Examiner* — Kyung H Shin
(74) *Attorney, Agent, or Firm* — Fitzpatrick, Cella, Harper & Scinto

(57) ABSTRACT

The position and orientation of the viewpoint of the observer are acquired (2030), the moving amount of a movable part is acquired (2032), a movable part of a virtual object is moved based on the moving amount of the movable part of a physical object, and an image which is observed from the viewpoint of the observer is generated (2040).

8 Claims, 15 Drawing Sheets

OTHER PUBLICATIONS

Andrei State et al., "Superior Augmented Reality Registration by Integrating Landmark Tracking and Magnetic Tracking", Computer Graphics Proceedings, Annual Conference Series, Pub. Aug. 4, 1996, pp. 429-438.

S.-K. Jung et al., "3-D Tracking and Motion Estimation Using Hierarchial Kalman Filter", IEE Proceedings: Vision, Image and Signal Processing, Institution of Electrical Engineers, vol. 144, No. 5, Oct. 22, 1997, pp. 293-298.

S. Yonemoto et al., "Shape and Pose Parameter Estimation of 3D Multi-part Objects", Computer Vision: Proceedings CCV '98, Third Asian Conference on Computer Vision, Hong Kong, China, Jan. 8-10, 1998, vol. 2, Jan. 1, 1997, pp. 479-486.

S. Yonemoto et al., "Tracking of 3D Multi-Part Objects Using Multiple Viewpoint Time-Varying Sequences", Proceedings, Fourteenth International Conference on Pattern Recognition, Brisbane, Australia, Aug. 16-20, 1998, IEEE Computer Soc., vol. 1, Aug. 16, 1998, pp. 490-494.

T. Nunomaki et al., "Multi-part Non-rigid Object Tracking Based on Time Model-Space Gradients", Articulated Motion and Deformable Objects Lecture Notes in Computer Science, LNCS, vol. 1899, Jan. 1, 2000, pp. 72-82, 2000.

Supplementary European Search Report in European Application No. 06 73 2336, dated Jan. 29, 2010.

R. Haralick, et al., "Review and Analysis of Solutions of the Three Point Perspective Pose Estimation Problem", International Journal of Computer Vision, vol. 13, No. 3, 1994, pp. 331-356.

D.G. Lowe, "Fitting Parameterized Three-Dimensional Models to Images", IEEE Transactions on PAMI, vol. 13, No. 5, 1991, pp. 441-450.

European Search Report in foreign counterpart application EP Application No. 06732336, dated Nov. 22, 2011.

* cited by examiner

Marker Data File ######

CoodSys world {          # CoodSys [ NAME OF COORDINATE SYSTEM TO WHICH INDEX BELONGS ]
 WORLD                   # [ WORLD / INDEPENDENT/ ON [PARENT COORDINATE SYSTEM NAME ] TYPE OF COORDINATE SYSTEM
}

CoodSys mock {
 ON world {                                              1401
  translation ( 500.0, -600.0, 400.0 )    #TRANSFORMATION FROM WORLD COORDINATE SYSTEM INTO MOCKUP COORDINATE SYSTEM (TRANSLATION)
  rotation    ( 0.0, 0.0, 1.0 ) 0.0       #TRANSFORMATION FROM WORLD COORDINATE SYSTEM INTO MOCKUP COORDINATE SYSTEM (ROTATION)
  scale       ( 1.0, 1.0, 1.0 )           #TRANSFORMATION FROM WORLD COORDINATE SYSTEM INTO MOCKUP COORDINATE SYSTEM (SCALE)
 }
}

SquareMarker mock_01 {                                   1403
  position    ( -30.0, -50.0, 85.0 )      #INDEX NAME
  orientation ( 0.0, 1.0, 0.0 ) 120.0     #POSITION OF INDEX ON MOCKUP COORDINATE SYSTEM
  size 50.0                               #ORIENTATION OF INDEX ON MOCKUP COORDINATE SYSTEM
  bitId 1                                 #INDEX SIZE
}                                         #INDEX ID NUMBER CoodSys unit {
 ON mock {                                               1402
  translation ( -50.0, 200.0, 150.0 )     #TRANSFORMATION FROM MOCKUP COORDINATE SYSTEM INTO UNIT COORDINATE SYSTEM (TRANSLATION)
  rotation    ( 0.0, 1.0, 0.0 ) 90.0      #TRANSFORMATION FROM MOCKUP COORDINATE SYSTEM INTO UNIT COORDINATE SYSTEM (ROTATION)
  scale.( 1.0, 1.0, 1.0 )                 #TRANSFORMATION FROM MOCKUP COORDINATE SYSTEM INTO UNIT COORDINATE SYSTEM (SCALE)
 }
}

Square Marker unit_01 {                                  1404
  position    ( 10.0, -130.0, 140.0 )
  orientation ( 0.0, 0.0, 1.0 ) 90.0
  size 50.0
  bitId 2
}

F I G. 14

IMAGE PROCESSING METHOD AND IMAGE PROCESSING APPARATUS

TECHNICAL FIELD

The present invention relates to a technique for superimposing an image on a virtual space onto a physical space to present that image to an observer.

BACKGROUND ART

A mixed reality (MR) system provides, to the user, a mixed reality space image obtained by combining a physical space image and a virtual space image generated in correspondence with the viewpoint position, orientation, and the like of the user. The MR system can present to the observer as if a virtual object were existing on a physical space, and allows the observer to make an observation with a sense of actual dimensions and higher reality than a conventional virtual reality (VR) system.

On the other hand, designs (shapes and designs) using three-dimensional (3D) CAD have become mainstream in the design and manufacture fields. In this case, as a method of evaluating an object designed by the 3D-CAD, a method which displays data (solid format) created by the 3D-CAD on the screen of a computer as a 3D-CG and visually evaluates it, a method that produces a simple prototype (simple mockup) by a rapid prototyping apparatus or the like, and tactually evaluates it, and the like are popularly used.

However, with the method that displays 3D-CAD data on the screen of a computer as a 3D-CG, evaluation is made on the virtual space, and the object cannot be evaluated to have a sense of actual dimensions on the physical space. Also, the method that produces a simple prototype (simple mockup) by a rapid prototyping apparatus or the like is effective to recognize a rough shape, and the like, but this method cannot reproduce detailed information designed on the 3D-CAD such as details, colors, and the like of a design due to limitations on machining accuracy, materials, and so forth.

In order to evaluate design data in a situation closer to a completed product, the following method is proposed. That is, 3D-CG data created by converting 3D-CAD data is superimposed on a simple prototype (simple mockup) produced based on the 3D-CAD data by a rapid prototyping apparatus or the like using the MR system while matching the position and orientation. As a result, visual and tactual evaluations are realized at the same time, and the design data can be evaluated in a state closer to a completed product.

Furthermore, a method of arranging indices on a simple prototype, detecting the arranged indices from image information of the physical space input as image data, and correcting registration between the physical space and virtual space using the detected position and orientation information of the indices has also been proposed.

However, the conventional method can only handle a simple prototype which is a rigid body. More specifically, when a simple prototype has a movable part, it is impossible to superimpose the 3D-CG data on the simple prototype while moving the 3D-CG data in correspondence with the movement of the movable part. Also, it is impossible to use the position and orientation information of the indices arranged on the movable part so as to correct registration between the physical space and virtual space.

DISCLOSURE OF INVENTION

The present invention has been made in consideration of the aforementioned problems, and has as its object to provide a technique for superimposing 3D-CG data on a simple prototype while moving the 3D-CG data in correspondence with the movement of a movable part when the simple prototype has the movable part.

In order to achieve an object of the present invention, for example, an image processing method of the present invention comprises the following arrangement.

That is, an image processing method for generating and outputting an image of a virtual space, characterized by comprising:

a first acquisition step of acquiring a position and orientation of a viewpoint of an observer;

a second acquisition step of acquiring a position and orientation of a physical object having a movable part;

an acquisition step of acquiring a moving amount of the movable part;

a moving step of moving a part, corresponding to the movable part, of a virtual object which represents the physical object based on the moving amount;

a generation step of generating an image which is seen when the virtual object, the part corresponding to the movable part of which is moved in the moving step, is observed from the viewpoint, based on the position and orientation of the viewpoint of the observer and the position and orientation of the physical object; and an output step of outputting the image generated in the generation step.

In order to achieve an object of the present invention, for example, an image processing apparatus of the present invention comprises the following arrangement.

That is, an image processing apparatus for generating and outputting an image of a virtual space, characterized by comprising:

a first acquisition unit adapted to acquire a position and orientation of a viewpoint of an observer;

a second acquisition unit adapted to acquire a position and orientation of a physical object having a movable part;

an acquisition unit adapted to acquire a moving amount of the movable part;

a moving unit adapted to move a part, corresponding to the movable part, of a virtual object which represents the physical object based on the moving amount;

a generation unit adapted to generate an image which is seen when the virtual object, the part corresponding to the movable part of which is moved by said moving unit, is observed from the viewpoint, based on the position and orientation of the viewpoint of the observer and the position and orientation of the physical object; and an output unit adapted to output the image generated by said generation unit.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIG. 14 shows an example of the data structure used to manage position and orientation information of indices.

BEST MODE FOR CARRYING OUT THE INVENTION

Preferred embodiments of the present invention will now be described in detail in accordance with the accompanying drawings.

First Embodiment

Figure 1:
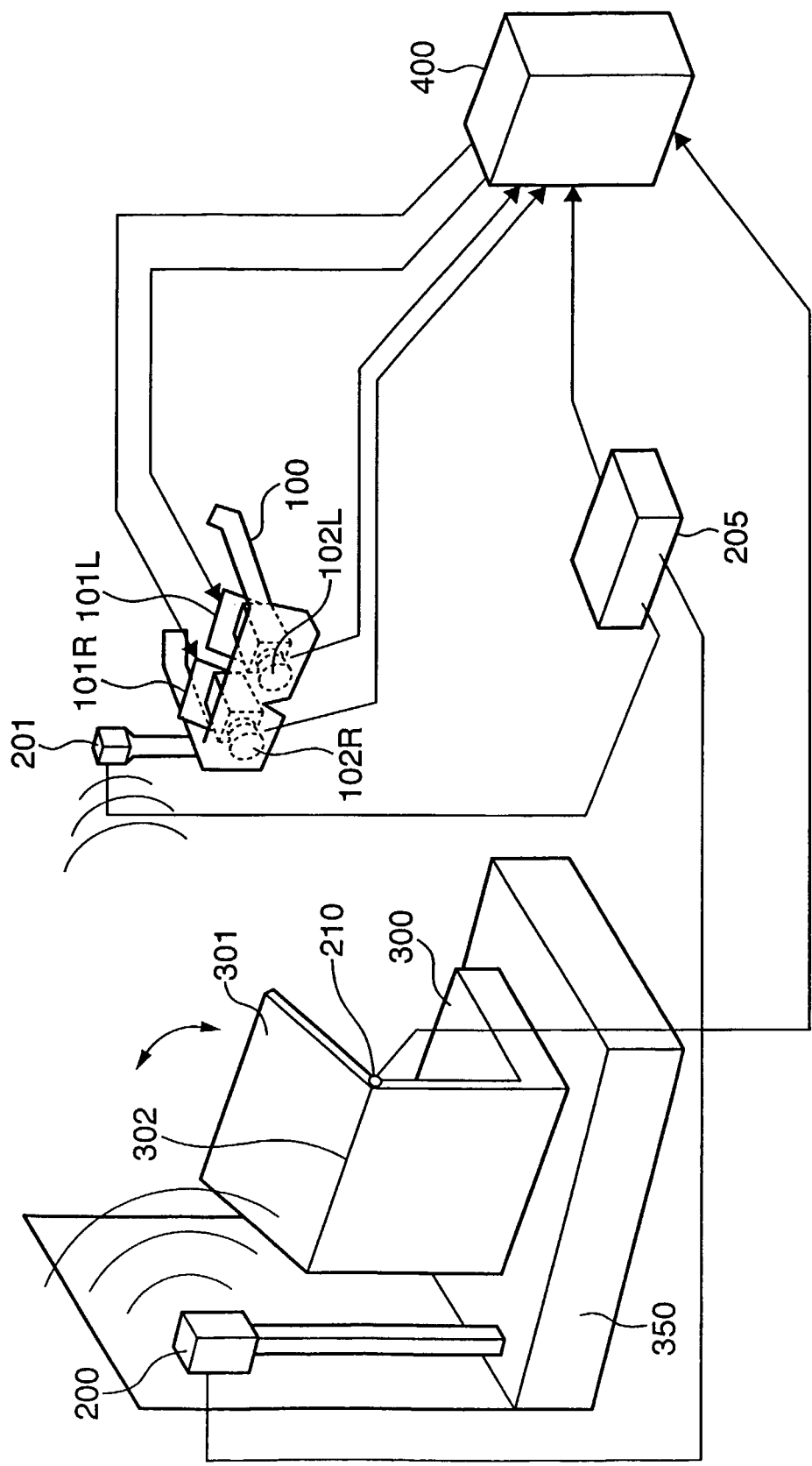
FIG. 1 is a view showing the outer appearance of a system which moves a movable part of the virtual object in correspondence with the movement of the movable part of the physical object according to the first embodiment of the present invention.

FIG. 1 is a view showing the outer appearance of a system which, when a virtual object that represents a physical object (simple prototype) having a movable part is superimposed on that physical object in the process of presenting an MR space obtained by superimposing a virtual space onto a physical space to the observer (user), moves a part corresponding to the movable part of the virtual object in correspondence with the movement of the movable part.

Referring to FIG. 1, reference numeral 200 denotes a transmitter which generates a magnetic field. Reference numeral 100 denotes a head mounted display (to be referred to as an HMD hereinafter), which is mounted on the head of the observer to present images formed by combining a physical space and virtual space to positions before eyes. The HMD 100 comprises cameras 102R and 102L, display devices 101R and 101L, and a magnetic receiver 201.

The cameras 102R and 102L respectively continuously capture the physical space which is seen from the right and left eyes of the observer who wears the HMD 100, and output the captured frame images to a computer 400.

The display devices 101R and 101L are respectively attached to the HMD 100 so as to be located in front of the right and left eyes when the observer wears the HMD 100 on the head, and display images based on image signals output from the computer 400. Therefore, images generated by the computer 400 are presented to the positions before the right and left eyes of the observer.

The magnetic receiver 201 detects a change in magnetic field generated by the transmitter 200, and outputs a detection result signal to a position and orientation measuring device 205. The detection result signal indicates a change in magnetic field which is detected in correspondence with the position and orientation of the magnetic receiver 201 on a coordinate system (to be referred to as a sensor coordinate system hereinafter) which has the position of the transmitter 200 as an origin, and three axes perpendicular to each other at the position of this origin as x-, y-, and z-axes.

The position and orientation measuring device 205 obtains the position and orientation of the magnetic receiver 201 on the sensor coordinate system based on this signal, and outputs data indicating the obtained position and orientation to the computer 400.

Figure 2:
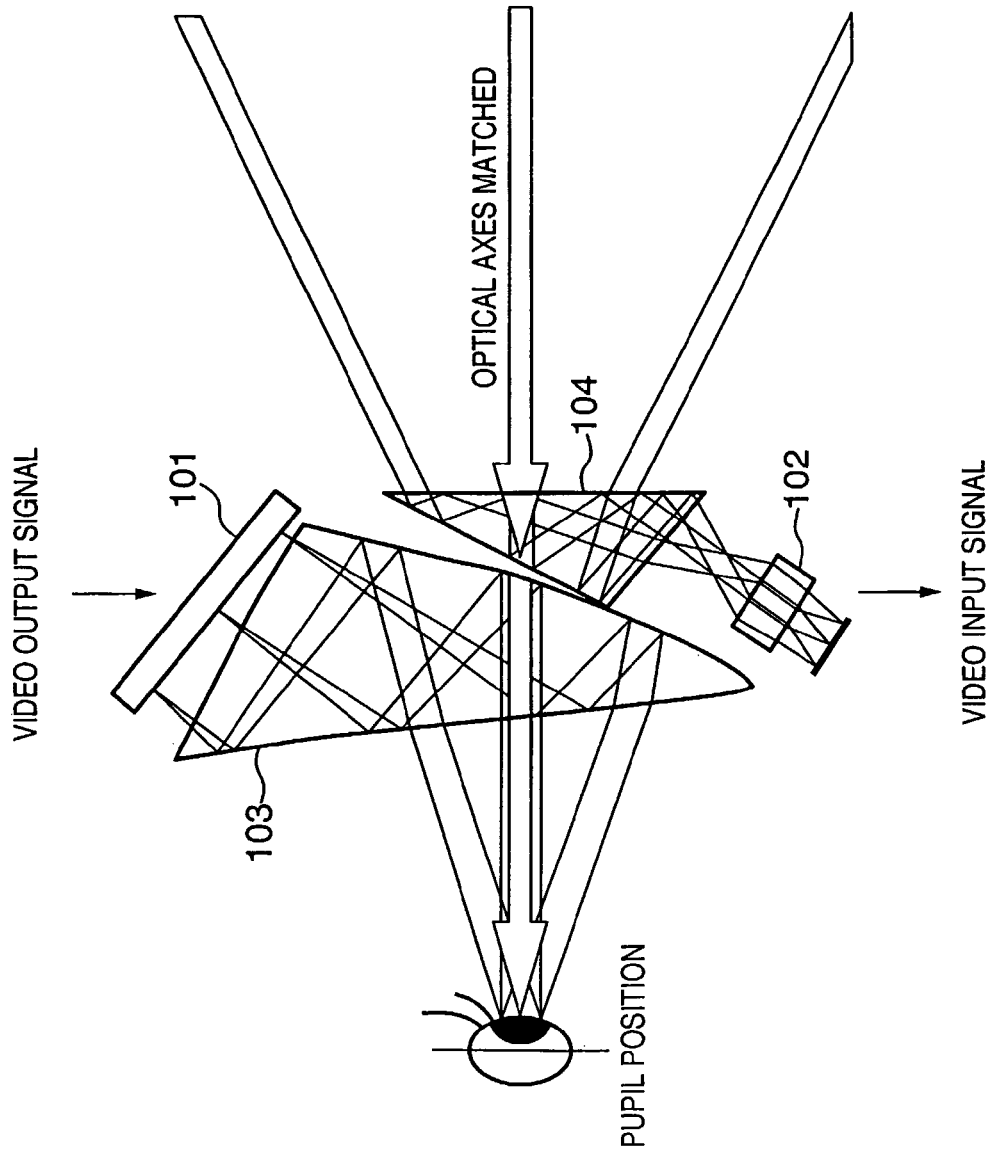
FIG. 2 is a view showing the detailed structure of an HMD 100.

FIG. 2 shows the detailed structure of the HMD 100.

Reference numeral 101 denotes a video display device, which comprises a compact liquid crystal display device of 0.5 to several inches. Reference numeral 103 denotes a sculptured surface prism which serves as a lens that scales up an image of the video display device 101. With this arrangement, an image displayed on the video display device 101 is presented as an image equivalent to that of 90 inches to, e.g., a position 2 m ahead of the observer.

Reference numeral 102 (102R, 102L) denotes a video input device which comprises an imaging device such as a CCD camera, CMOS camera, or the like. Reference numeral 104 denotes an imaging system prism which serves as a lens for converging light on the physical space to the video input device 102. Since the imaging system prism 104 is arranged outside the sculptured surface prism 103 so that their optical axes agree with each other, the parallax between an image input by the video input device 102 and that displayed on the video display device 101 is removed, thus naturally reproducing an image of the physical space.

Referring back to FIG. 1, reference numeral 300 denotes a physical object (to be referred to as a simple prototype hereinafter). The simple prototype 300 has a movable part 301 which is free to move around a shaft 302, as indicated by the arrow in FIG. 1, when it is manually moved by the operator. The shaft 302 serves as an axis around which the movable part 301 is movable. A rotary encoder 210 used to measure the moving amount of the movable part 301 is attached to the simple prototype 300, and outputs a signal indicating the measured moving amount to the computer 400.

Reference numeral 350 denotes a table used as a rest upon observing the simple prototype 300.

Figure 12:
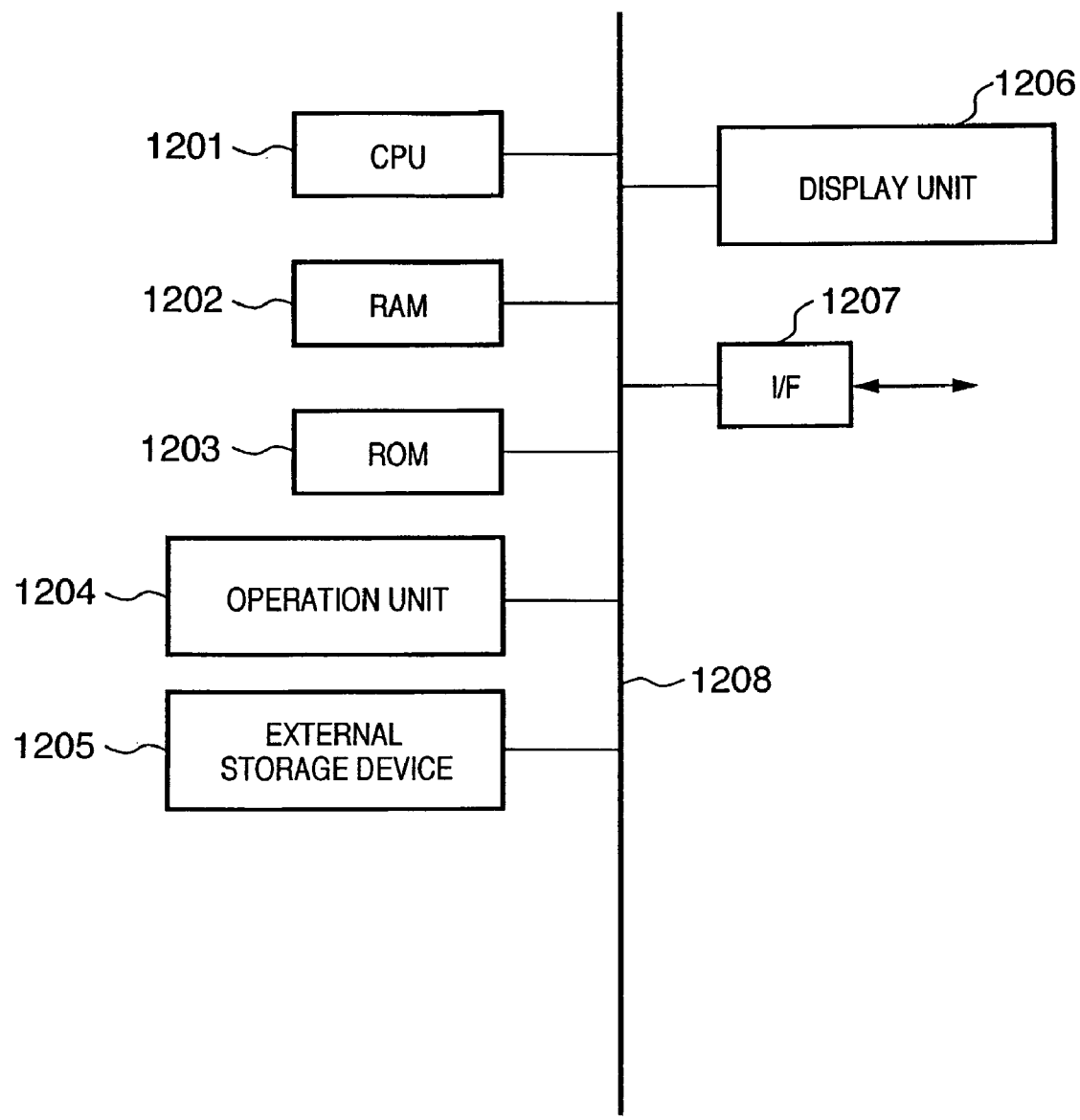
FIG. 12 is a block diagram showing the basic arrangement of a computer 400.

Reference numeral 400 denotes a computer which generates image signals to be output to the display devices 101R and 101L of the HMD 100, receives and manages data from the position and orientation measuring device 205 and data based on the signal from the rotary encoder 210, and so forth. This computer 400 normally comprises, e.g., a PC (personal computer), WS (workstation), or the like. FIG. 12 is a block diagram showing the basic arrangement of the computer 400.

Reference numeral 1201 denotes a CPU which controls the entire computer 400 using programs and data stored in a RAM 1202 and ROM 1203, and controls data communications with external devices connected to an I/F 1207. Also, the CPU 1201 executes processes to be described later as those to be executed by the computer 400.

Reference numeral 1202 denotes a RAM which has an area for temporarily storing programs and data loaded from an external storage device 1205, and also a work area required when the CPU 1201 executes various kinds of processing.

Reference numeral 1203 denotes a ROM which stores a boot program, setting data of the computer 400, and the like.

Reference numeral 1204 denotes an operation unit which comprises a keyboard, mouse, joystick, and the like, and can input various instructions to the CPU 1201.

Reference numeral 1205 denotes an external storage device which serves as a large-capacity information storage device such as a hard disk drive device or the like. The external storage device 1205 saves an OS (operating system), programs that make the CPU 1201 execute the processes to be described later, data, and the like. Some or all of these programs and data are loaded onto the RAM 1202 under the control of the CPU 1201. Also, given data (information) (or data required in processing to be described later) in the following description are also saved in this external storage device 1205, and are loaded as needed onto the RAM 1202 under the control of the CPU 1201.

Reference numeral 1206 denotes a display unit which comprises a CRT, liquid crystal display, or the like, and can display various kinds of information by means of images and characters.

Reference numeral 1207 denotes an I/F to which the position and orientation measuring device 205, HMD 100, rotary encoder 210, and the like are connected. Via this I/F 1207, the computer 400 can make data communications with the position and orientation measuring device 205, HMD 100, rotary encoder 210, and the like.

Reference numeral 1208 denotes a bus which interconnects the aforementioned units.

The computer 400 captures images of the physical space obtained from the cameras 102R and 102L, and generates images of a virtual object, which are to be seen from the cameras 102R and 102L, based on the position and orientation obtained from the magnetic receiver 201 and the predetermined position and orientation of the simple prototype 300. The computer 400 superimposes the generated images onto the previously captured images of the physical space, and outputs the superimposed images to the display devices 101R and 101L. In this way, the MR images corresponding to the positions and orientations of the two eyes are displayed at positions before the right and left eyes of the observer who wears the HMD 100 on the head.

Figure 3:
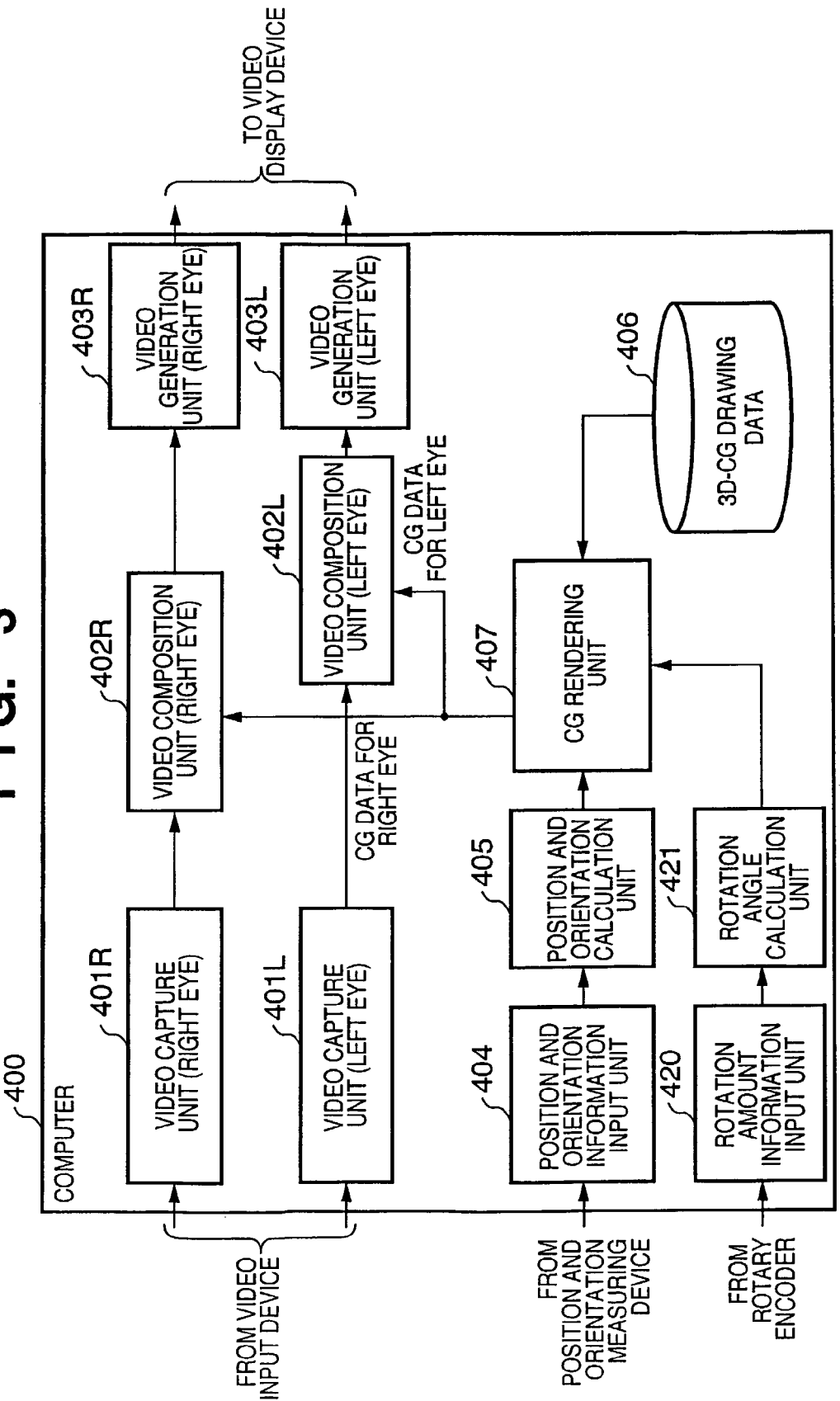
FIG. 3 is a block diagram showing the functional arrangement of a computer 400.

FIG. 3 is a block diagram showing the functional arrangement of this computer 400. In the following description of this embodiment, assume that respective units shown in FIG. 3 are implemented by software. Note that the CPU 1201 performs software execution processing. However, some or all units shown in FIG. 3 may be implemented by hardware.

Reference numerals 401R and 401L denote video capture units, which respectively capture images input from the cameras 102R and 102L as digital signals.

Reference numeral 404 denotes a position and orientation information input unit, which fetches data output from the position and orientation measuring device 205. This data indicates the position and orientation of the magnetic receiver 201 on the sensor coordinate system.

Reference numeral 406 denotes 3D-CG drawing data, which represents the simple prototype 300 and is used to generate an image of a virtual object to be superimposed on this simple prototype 300. The 3D-CG drawing data includes data indicating the geometric shape and colors of the virtual object, texture data, and the like. Also, the 3D-CG drawing data includes data indicating the position and orientation of the simple prototype 300 on the sensor coordinate system (including initial position and orientation data of the movable part 301).

Reference numeral 405 denotes a position and orientation calculation unit, which calculates a position and orientation of the simple prototype 300 relative to those of the magnetic receiver 201 using the data indicating the position and orientation of the magnetic receiver 201 on the sensor coordinate system input from the position and orientation information input unit 404, and the data indicating those of the simple prototype 300 on the sensor coordinate system.

Reference numeral 420 denotes a rotation amount information input unit which receives a signal from the rotary encoder 210, converts it into digital data, and outputs that digital data to a rotation angle calculation unit 421.

Reference numeral 421 denotes a rotation angle calculation unit which calculates the rotation angle (moving amount) of the movable part 301 based on the signal received from the rotation amount information input unit 420.

Reference numeral 407 denotes a CG rendering unit which lays out the virtual object that represents the simple prototype 300 at the predetermined position and orientation (acquired from the 3D-CG drawing data) first. The CG rendering unit 407 lays out a part of the virtual object corresponding to the movable part 310 by rotating it through the current rotation angle of the movable part 301 (the rotation angle calculated by the rotation angle calculation unit 421) around the shaft 302. Since a technique for rotating a part (partial virtual object) corresponding to the movable part 301 around a predetermined axis is a state-of-the-art technique in the CG field, a description thereof will be omitted.

Next, the CG rendering unit 407 generates images of a virtual object, which are to be seen according to the positions and orientations of the cameras 102R and 102L (if the position and orientation relationship between the magnetic receiver 201 and the cameras 102R and 102L is obtained in advance as a bias, the positions and orientations of the cameras 102R and 102L can be calculated by adding the bias to the position and orientation measured by the magnetic receiver 201). Note that the virtual object is the one to be superimposed on the simple prototype 300.

Therefore, the image of the virtual object becomes an image, which is laid out to have the predetermined position and orientation on the virtual space, and is to be seen according to the positions and orientations of the cameras 102R and 102L, calculated by the position and orientation calculation unit 405. Note that the processing for generating an image of a virtual object, which is seen from a viewpoint having a predetermined position and orientation, is a state-of-the-art technique, and a detailed description thereof will be omitted.

In the following description, the cameras 102R and 102L will also be referred to as a "viewpoint" in some cases.

Reference numerals 402R and 402L denote video composition units, which superimpose the images of the virtual object, which are generated by the CG rendering unit 407 and are to be seen according to the positions and orientations of the cameras 102R and 102L, onto the images of the physical space input from the video capture units 401R and 401L, and output these images to video generation units 403R and 403L, respectively. In this way, the image of the MR space, which is to be seen according to the position and orientation of the camera 102R, and that of the MR space, which is to be seen according to the position and orientation of the camera 102L, can be generated.

The video generation units 403R and 403L respectively convert the images of the MR space, which are output from the video composition units 402R and 402L into analog signals, and outputs the converted analog signals to the display devices 101R and 101L as video signals. In this way, the images of the MR space which correspond to the two eyes are displayed before the right and left eyes of the observer who wears the HMD 100 on the head.

Figure 4:
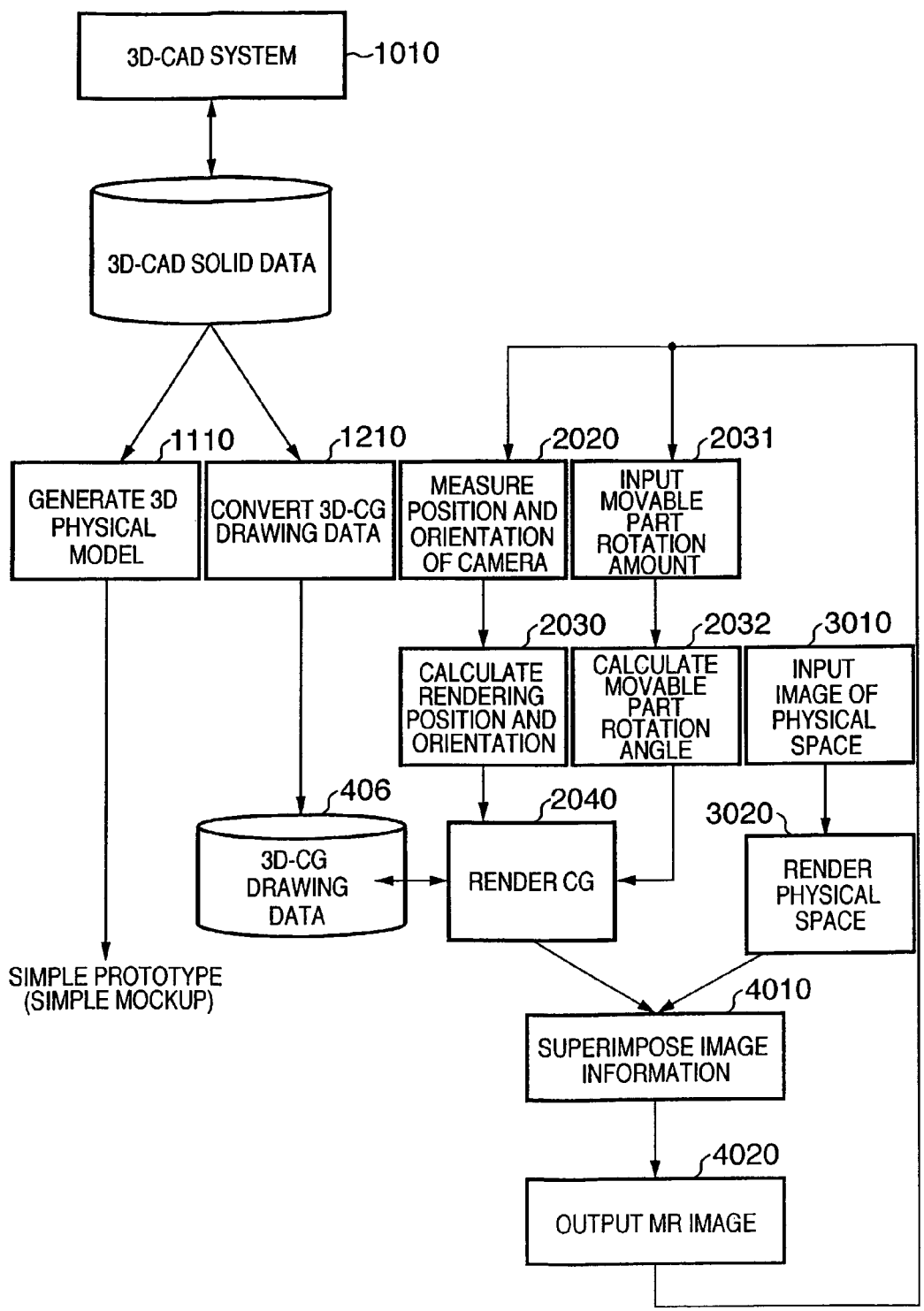
FIG. 4 is a chart showing the sequence of processing for presenting, to the right and left eyes of the observer, images of the MR space which are seen according to their positions and orientations according to the first embodiment of the present invention.

Processing for presenting the images of the MR space, which are to be seen according to the positions and orientations, to the right and left eyes of the observer will be described below with reference to FIG. 4 which shows the sequence of this processing.

The processing sequence for generating the simple prototype 300 and 3D-CG drawing data from 3D-CAD data will be described first with reference to the left side of FIG. 4.

Normally, in case of a design task (1010) such as a shape, design, and the like using a 3D-CAD system, it is a common practice to save 3D-CAD data as solid data unique to each individual 3D-CAD system. The simple prototype 300 is produced based on this solid data using a rapid prototyping apparatus such as stereo lithography or the like (1110).

On the other hand, 3D solid data is expressed as a set of geometric parameters of respective design parts, and cannot be rendered as a CG intact. Hence, the 3D solid data is converted into a data format (e.g., VRML or the like) suited to render a 3D-CG (1210). This MR system generates the virtual space using 3D-CG drawing data 406 which is converted in this way. The generated 3D-CG drawing data 406 is saved in the external storage device 1205 of the computer 400, and is loaded onto the RAM 102 as needed.

The processing for generating images of the virtual space (images of the virtual object) using this 3D-CG drawing data 406, superimposing these images onto those of the physical space, and presenting them to the observer, which is executed by the MR system, will be described below with reference to the right side of FIG. 4.

The magnetic receiver 201 measures a change in magnetic field generated by the transmitter 200 (2020), as described above, and outputs the measurement result to the position and orientation measuring device 205 as a signal. The position and orientation measuring device 205 outputs data indicating the position and orientation of the magnetic receiver 201 on the sensor coordinate system (the positions and orientations of the cameras 102R and 102L if the bias is added, as described above) to the computer 400 based on the received signal (2030).

On the other hand, since the rotation amount information input unit 420 receives a signal indicating the current rotation angle of the movable part 301, which is measured by the rotary encoder 210 (2031), it A/D-converts the signal into digital data, and outputs the digital data to the rotation angle calculation unit 421. The rotation angle calculation unit 421 executes processing for calculating the current rotation angle of the movable part 301 based on this data (2032).

Let d0 be the initial measurement value of the rotary encoder 210 (a count value counted by the rotary encoder 210 when the rotation angle of the movable part 301 is 0°), d1 be the current measurement value of the rotary encoder 210, and r be the measurement value of the rotary encoder 210 when the movable part 301 rotates through 360°. Then, a current angle θ of the movable part 301 is given by:

$$\theta = 360 \times (d1-d0)/(r-d0)$$

When a gear with a gear ratio g is attached to the rotary encoder 210, the current angle θ of the movable part 301 is calculated by:

$$\theta = 360 \times g \times (d1-d0)/(r-d0)$$

Figure 13:
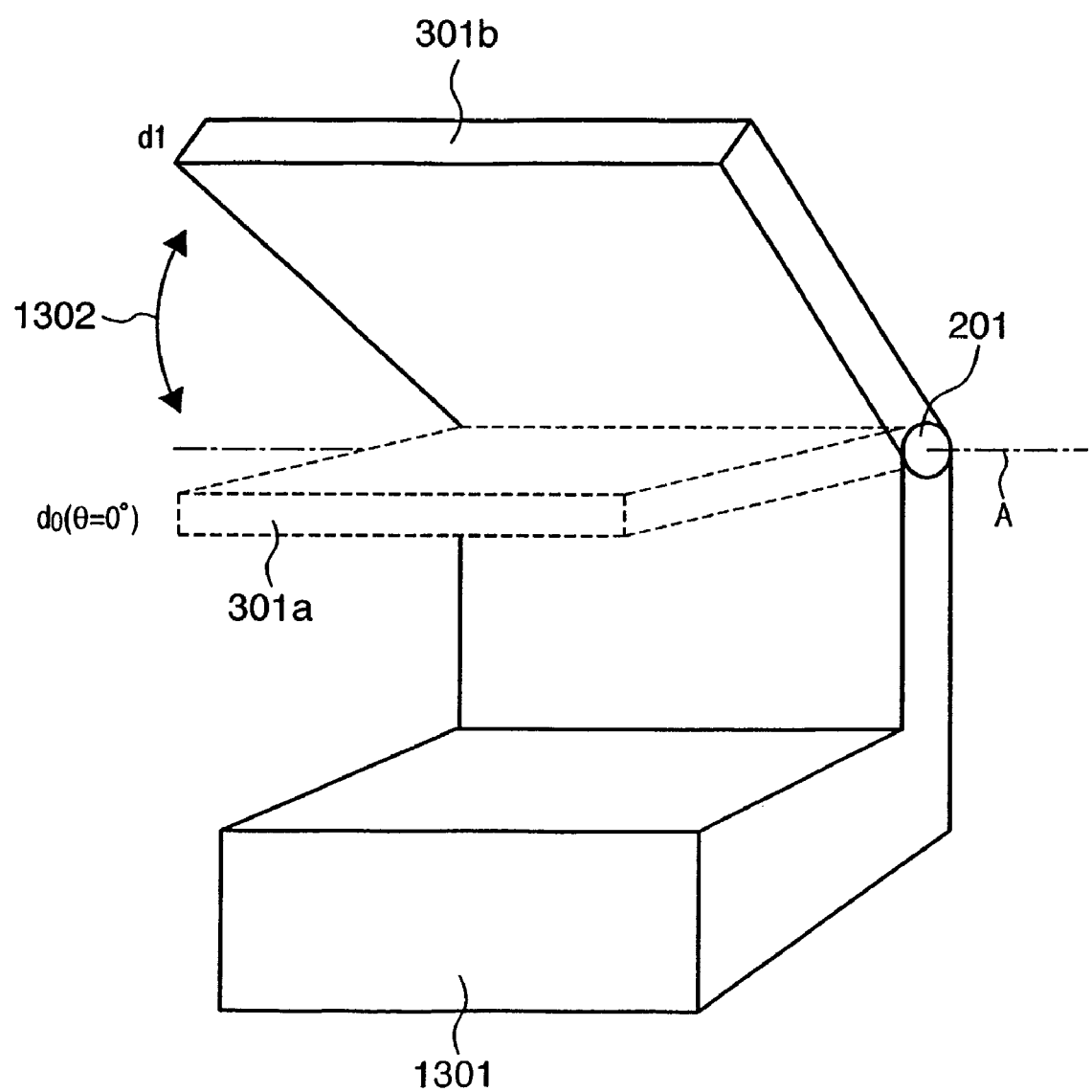
FIG. 13 shows a moving mode of a movable part 301 of a simple prototype 300 used in the first embodiment of the present invention.

In either case, such calculations are made by the rotation angle calculation unit 421. FIG. 13 shows a moving mode of the movable part 301 of the simple prototype 300 used in this embodiment. The simple prototype 300 is made up of a main body 1301 and the movable part 301, the angle of which is free to be manually changed around an axis A by the observer, as indicated by an arrow 1302 in FIG. 13. This angle is measured by the rotary encoder 210.

Referring to FIG. 13, reference numeral 301a denotes the movable part 301 when the angle θ is 0° (when the measurement value of the rotary encoder 210 is d0); and 301b, the movable part 301 at the current angle θ (when the measurement value of the rotary encoder 210 is d1).

Referring back to FIG. 4, the CG rendering unit 407 generates images of the "virtual object to be superimposed on the simple prototype 300", which are respectively seen from the cameras 102R and 102L (2040). In this image generation processing, the CG rendering unit 407 lays out the "virtual object to be superimposed on the simple prototype 300" at the predetermined position and orientation on the sensor coordinate system first. In this case, the CG rendering unit 407 lays out a model of the part of the virtual object corresponding to the movable part 301 by rotating it through the angle θ around the shaft 302 (axis A in FIG. 13). In this manner, the movable part of the virtual object can be moved by the same moving amount of the actual movable part 301, and their rotation angles can be matched.

The CG rendering unit 407 then generates the images of the "virtual object to be superimposed on the simple prototype 300", which are respectively seen from the positions and orientations of the cameras 102R and 102L, using "data indicating the positions and orientations of the cameras 102R and 102L on the sensor coordinate system", which are calculated by the position and orientation calculation unit 405.

Note that data of the generated images are temporarily stored in a predetermined area of the RAM 1202. Also, in order to generate the images of the virtual object, 3D-CG drawing data which is saved in the external storage device 1205 is read out onto the RAM 1202 and is used.

On the other hand, parallel to the processes 2020, 2030, 2040, 2031, and 2032, the images of the physical space captured by the cameras 102R and 102L are input to the computer 400 by the video capture units 401R and 401L (3010), and are rendered on the RAM 1202 (3020).

The video composition unit 402R superimposes an image for the right eye (that of the virtual object), which is rendered by the CG rendering unit 407, on the image of the physical space for the right eye, which is input from the video capture unit 401R, and outputs the superimposed image (an image of the MR space) to the video generation unit 403R (4010).

On the other hand, the video composition unit 402L superimposes an image for the left eye (that of the virtual object), which is rendered by the CG rendering unit 407, on the image of the physical space for the left eye, which is input from the video capture unit 401L, and outputs the superimposed image (an image of the MR space) to the video generation unit 403L (4010).

More specifically, in the superimposing processing of the images of the virtual object onto those of the physical space, the processing for superimposing the image of the virtual object, which is seen from the position and orientation of the camera 102R, on the image of the physical space from the camera 102R, and superimposing the image of the virtual object, which is seen from the position and orientation of the camera 102L, on the image of the physical space from the camera 102L is executed. As a result, the image of the MR space, which is seen from the right eye of the observer, and that of the MR space, which is seen from the left eye, can be generated.

The video generation units 403R and 403L respectively convert the received images of the MR space into video signals as analog signals, and output them to the display devices 101R and 101L via the I/F 1207 (4020).

By repeating the processes 2020 to 4020 at video update intervals of the display devices (101R, 101L) or at intervals shorter than the execution time of the process 2040, information can be presented in real time.

In this embodiment, a magnetic sensor is used as a sensor. However, sensors of other types such as an ultrasonic wave sensor and the like may be used instead.

In this embodiment, a rotary encoder is used to measure the rotation angle of the movable part 301. However, the rotation angle may be measured using other measuring devices, and the present invention is not particularly limited to the measuring device.

In this embodiment, movement of the movable part includes only rotation around a stationary axis. However, as "movement", not only rotation but also other moving modes such as translation and the like may be included. In this case, a device that can measure the moving amount (e.g., devices such as a linear encoder, a magnetic or optical position and orientation measuring device, and the like) must be attached to that physical object.

As described above, when a simple prototype produced based on 3D data generated by the 3D-CAD has a movable part, a simple prototype and 3D-CG data can be superimposed and displayed by moving the 3D-CG data generated based on the identical 3D data in correspondence with the movement of the movable part.

In the description of this embodiment, the position and orientation of the simple prototype 300 are fixed. When a magnetic sensor is attached to the simple prototype 300 to measure its position and orientation on the sensor coordinate system, and when the position and orientation of the virtual object to be superimposed on the simple prototype 300 are moved accordingly, the virtual object can always be superimposed on the simple prototype 300. A detailed description of such processing will be described in the third embodiment.

In this embodiment, a video see-through type HMD is used. Alternatively, an optical see-through type HMD may be used. In this case, the computer 400 does not have to execute the processing for superimposing the images of the virtual space onto those of the physical space, i.e., the process 4010. In the process 4020, the images of the physical space generated by the video generation units 403R and 403L in the process 4010 (the images of the physical space for the right and left eyes) are converted into video signals as analog signals, and are output to the display devices 101R and 101L via the I/F 1207.

Second Embodiment

This embodiment will describe a system which can correct the position and orientation of the viewpoint of the observer who observes a simple prototype 300 (simple mockup) by arranging indices on the simple prototype 300 and movable part 301.

The first embodiment has exemplified a case wherein the position and orientation of the viewpoint of the observer are measured using magnetism. However, when magnetism is used, the measurement precision becomes unstable depending on the environment. For example, when a metal object exists near a magnetic transmitter, the magnetic field is disturbed, and a magnetic sensor outputs an unstable value. The measurement precision worsens with increasing distance between the magnetic transmitter and magnetic sensor. As another example of a measuring device, an optical measuring device is available. However, in this case, when a shielding object exists between a device for emitting light and a device for receiving light, it becomes impossible to measure.

Hence, in this embodiment, images of indices arranged on the simple prototype 300 and movable part 301 are captured, and the position and orientation of the viewpoint of the observer are corrected using the captured images.

The indices may be configured by, for example, circular markers having respectively different colors or feature points such as natural features having respectively different texture features. Alternatively, quadrangular indices, each formed by a quadrangular region having a certain area, may be used as the indices. The indices may be of any type as long as the image coordinates of a projected figure on a captured image can be detected and the indices can be individually identified.

Figure 5:
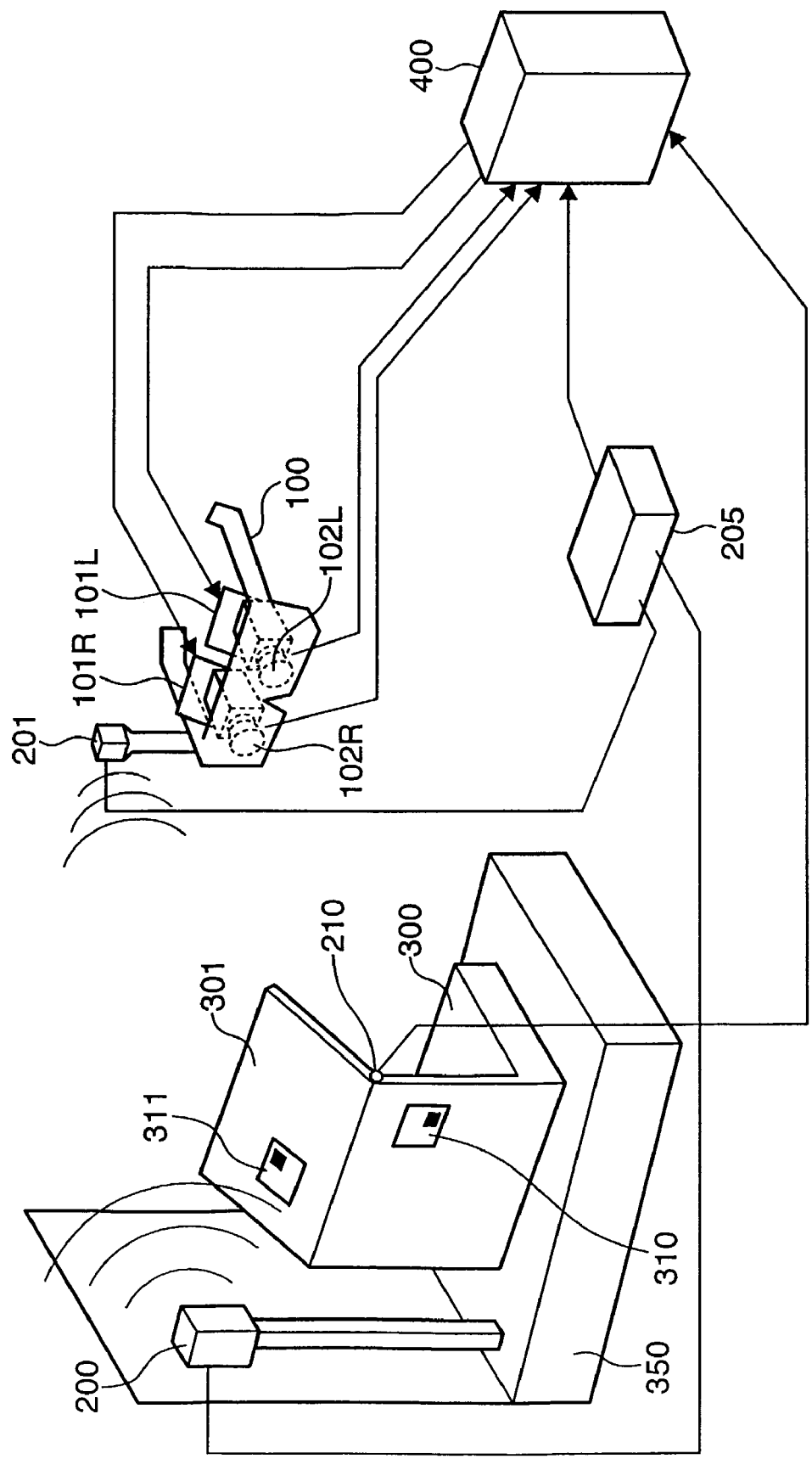
FIG. 5 is a view showing the outer appearance of a system which moves a movable part of the virtual object in correspondence with the movement of the movable part of the physical object according to the second embodiment of the present invention.

FIG. 5 is a view showing the outer appearance of a system which, when a virtual object that represents a physical object (simple prototype) having a movable part is superimposed on that physical object in the process of presenting an MR space obtained by superimposing a virtual space onto a physical space to the observer (user), moves a part corresponding to the movable part of the virtual object in correspondence with the movement of the movable part.

The same reference numerals in FIG. 5 denote the same parts as those in FIG. 1, and a description thereof will be omitted. The difference in the arrangement of FIG. 5 from that of FIG. 1 is that indices 310 and 311 are arranged on the simple prototype 300 and movable part 301, respectively. In FIG. 5, the number of indices arranged on each of the simple prototype 300 and movable part 301 is 1. However, the number of indices is not limited to this. A plurality of indices may be arranged on each of the simple prototype 300 and movable part 301, or no index may be arranged on the simple prototype 300.

Note that position information and orientation information of each index are expressed by a layer coordinate system. That is, the position information and orientation information of the indices arranged on the simple prototype 300 is described using a simple prototype coordinate system (which has one point on the simple prototype 300 as an origin, and three axes perpendicular to each other at the position of this origin as x-, y-, and z-axes). The position information and orientation information of the index attached to the movable part 301 is described using a movable part coordinate system (which has one point on the movable part 301 as an origin, and three axes perpendicular to each other at the position of this origin as x-, y-, and z-axes as a child coordinate system of the simple prototype coordinate system.

FIG. 14 shows an example of the data structure used to manage the position and orientation information of the indices. FIG. 14 shows a case wherein the name of a quadrangular index (hereinafter, called square marker) arranged on the simple prototype 300 is mock_01, and that of a square marker arranged on the movable part 301 is unit_01. Reference numeral 1401 denotes coordinate transformation information indicating the relationship between a world coordinate system and the simple prototype coordinate system (mockup coordinate system). Reference numeral 1403 denotes information (position and orientation information, size information, ID information) of square marker mock_01 arranged on the simple prototype 300 on the mockup coordinate system.

Reference numeral 1402 denotes coordinate transformation information indicating the relationship between the simple prototype coordinate system (mockup coordinate system) and movable part coordinate system (unit coordinate system). The coordinate transformation information 1402 is updated based on the output of the rotation angle calculation unit 421. Reference numeral 1404 denotes information (position and orientation information, size information, ID information) of square marker unit_01 attached to the movable part 301 on the unit coordinate system.

For example, the position and orientation of square marker unit_01 on the world coordinate system can be calculated by applying transformation based on the coordinate transformation information 1402 and coordinate transformation information 1401 to the position and orientation information 1404 of unit_01. Also, the position and orientation of square marker mock_01 on the world coordinate system can be calculated by applying transformation based on the coordinate transformation information 1401 to the position and orientation information 1403 of mock_01.

In this way, by managing the position and orientation information of the indices using a hierarchical structure, the relationship between the position and orientation information of the index arranged on the movable part and the world coordinate system can be easily managed.

Figure 6:
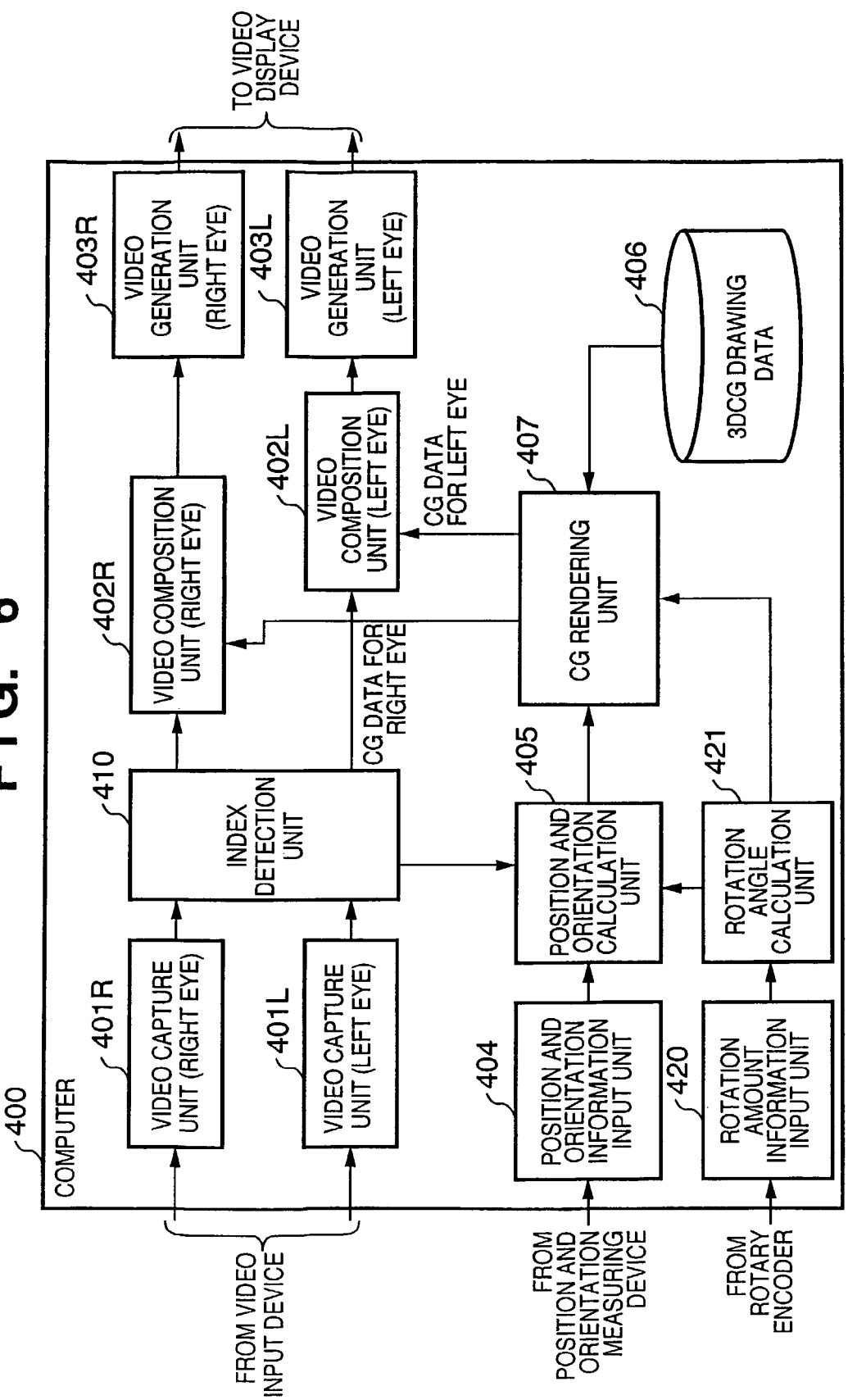
FIG. 6 is a block diagram showing the functional arrangement of a computer 400 according to the second embodiment of the present invention.

FIG. 6 is a block diagram showing the functional arrangement of the computer 400 according to this embodiment. The same reference numerals in FIG. 6 denote the same parts as those in FIG. 3, and a description thereof will be omitted. The difference in the arrangement of FIG. 6 from FIG. 3 is that a index detection unit 410 is added, and the position and orientation calculation unit 405 has different functions from those of FIG. 3.

Figure 15:
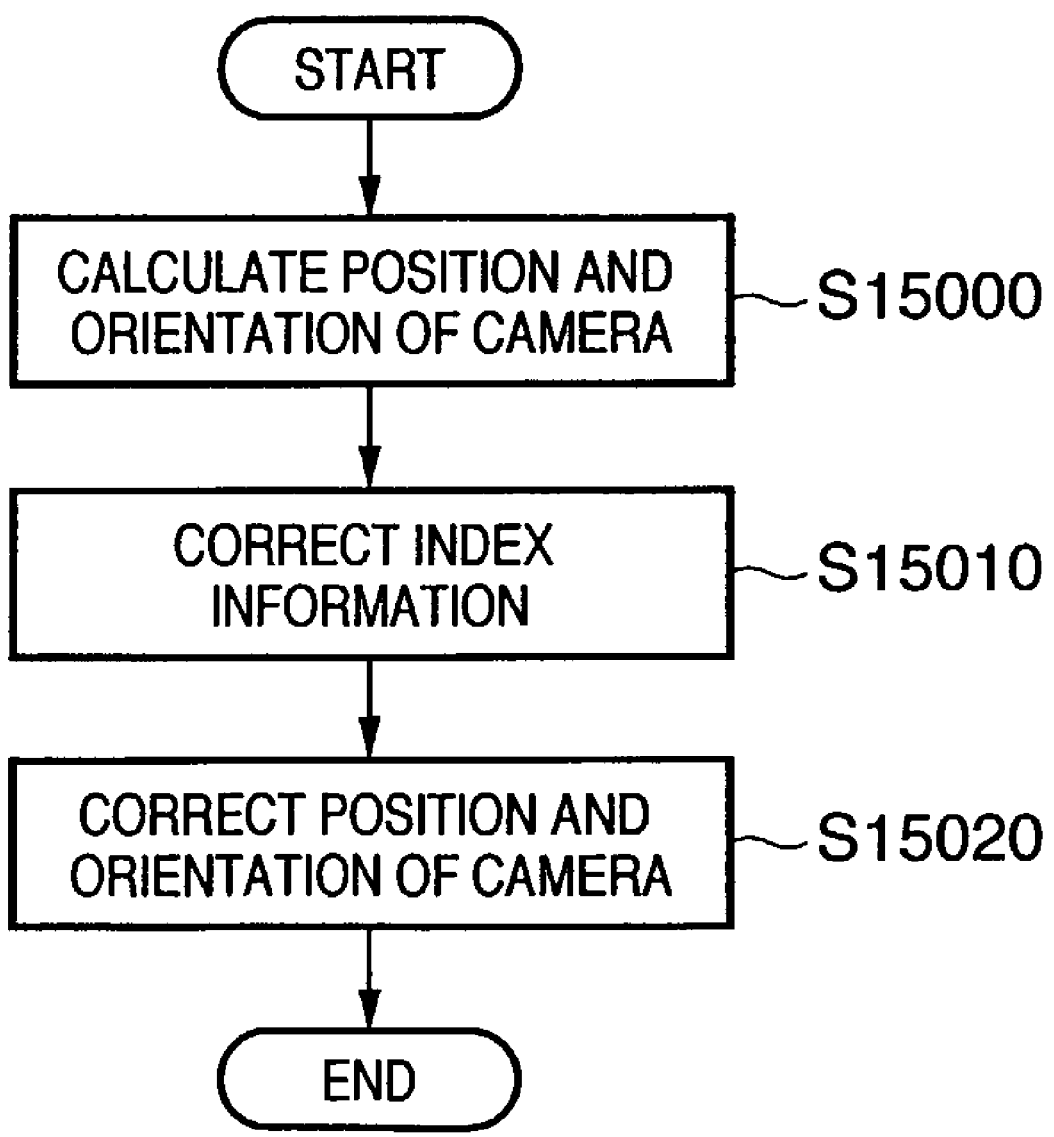
FIG. 15 is a flowchart of processing for calculating the position and orientation of the observer (user).

FIG. 15 is a flowchart of the processing for calculating the position and orientation, which is implemented when the CPU 1201 executes a software program of the position and orientation calculation unit 405. Note that a program code according to this flowchart has already been loaded onto the RAM 1202 prior to the following processing.

In step S15000, the position and orientation calculation unit 405 calculates the position and orientation of the simple prototype 300 relative to those of the magnetic receiver 201 using data indicating the position and orientation of the magnetic receiver 201 on the sensor coordinate system, which are input from the position and orientation information input unit 404, and data indicating the position and orientation of the simple prototype 300 on the sensor coordinate system.

In step S15010, the position and orientation calculation unit 405 corrects information of the index arranged on the movable part 301 based on the output value from the rotation angle calculation unit 421. For example, the unit 405 substitutes the output value from the rotation angle calculation unit 421 in the transformation (rotation) condition 1402 from the mockup coordinate system to the unit coordinate system in FIG. 14.

Since the value to be substituted in the transformation condition 1402 (rotation) can be directly calculated from the output value from the rotation angle calculation unit 421, the information of the position and orientation of the index arranged on the movable part 301 can be easily updated in real time.

In step S15020, the position and orientation calculation unit 405 corrects information of the position and orientation of the viewpoint of the camera using the corrected index information and the image coordinate information of the index detected by the index detection unit 410.

According to this embodiment, since the information of the index arranged on the movable part 301 is adjusted based on the output from the rotation angle calculation unit 421, the position and orientation of the viewpoint of the observer can be corrected or calculated more correctly than a case wherein the index information is not adjusted or a case wherein no index is primarily arranged on the movable part 301. According to this embodiment, since the indices can be arranged on the movable part, the degree of freedom in the arrangement of the indices can be increased.

Furthermore, a virtual image can be accurately superimposed on the movable part based on the indices on the movable part.

Figure 7:
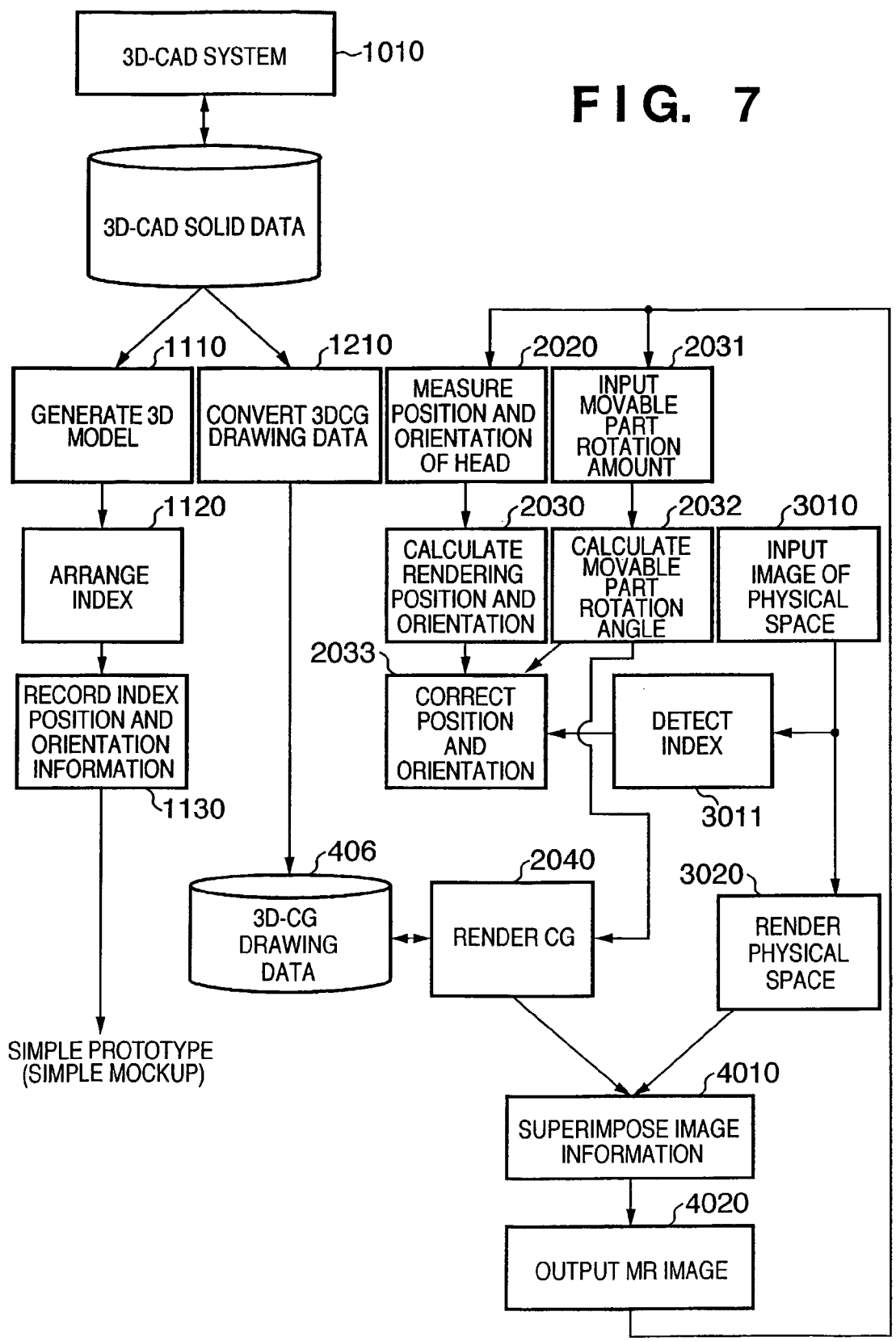
FIG. 7 is a chart showing the sequence of processing for presenting, to the right and left eyes of the observer, images of the MR space which are seen according to their positions and orientations according to the second embodiment of the present invention.

FIG. 7 is a chart showing the sequence of processing for presenting, to the right and left eyes of the observer, images of the MR space which are seen according to their positions and orientations. The same reference numerals in FIG. 7 denote the same processes as those in FIG. 4, and a description thereof will be omitted.

The processing for correcting the position and orientation of the viewpoint of the observer using the indices arranged on the simple prototype 300 and movable part 301 will be described below using FIGS. 6 and 7. Note that points other than those to be described below are basically the same as those in the first embodiment.

Indices are arranged on the simple prototype 300 which is produced based on 3D solid data using a rapid prototyping apparatus such as stereo lithography or the like (1120). The arranged position of the index is calculated. The calculation result is recorded in the external storage device 1205 together with the rotation angle determined by the above equation based on the measurement value of the rotary encoder 210 at that time (1130).

The processing for generating images of the virtual space (images of the virtual object) using this 3D-CG drawing data 406, superimposing these images onto those of the physical space, and presenting them to the observer, which is executed by the MR system, will be described below with reference to the right side of FIG. 7.

In this embodiment, in addition to the first embodiment, since the images of the physical space captured by the cameras 102R and 102L are input to the computer 400 by the video capture units 401R and 401L, the index detection unit 410 executes processing for extracting the indices from these images (3011). With this extraction processing, the position of each index in the images can be detected.

On the other hand, when the operator manually rotates the movable part 301 through a given angle, the angle at that time can be calculated, as described above. The position and orientation of the index on the sensor coordinate system are calculated using the "position of the index arranged on the movable part 301" and the position and orientation of the simple prototype 300, which are stored in the external storage device 1205, and the current index position (the position on the sensor coordinate system) obtained by rotating that index through the rotation angle is calculated.

With the above processing, since the position of the index attached to the movable part 301 on the sensor coordinate system and that of the index on the images can be obtained, the measurement result of the magnetic receiver 201 can be corrected using the relationship between these positions (2033). Since such correction method is known to those who are skilled in the art, a detailed description thereof will be omitted. Also, the present invention is not limited to such specific correction method.

Hence, after the position and orientation of the viewpoint are corrected by the aforementioned processing, the subsequent processes are executed in the same manner as in the first embodiment.

In this embodiment, movement of the movable part includes only rotation around a stationary axis. However, as "movement", not only rotation but also other moving modes such as translation and the like may be included as in the first embodiment. For example, when translation is measured by a linear encoder, the measurement value of the linear encoder can be substituted in the numerical value of the transformation (translation) from the mockup coordinate system to the unit coordinate system in FIG. 14.

In the description of this embodiment, the position and orientation of the viewpoint of the observer are measured using magnetism, and are corrected based on the indices. Alternatively, the position and orientation of the viewpoint of the observer may be measured based on only the indices without using magnetism. A method of calculating the position and orientation of a camera from the 3D coordinate position and image coordinate position of the indices is known in the field of photo survey or the like (for example, see R. M. Haralick, C. Lee, K. Ottenberg, and M. Nolle: Review and analysis of solutions of the three point perspective pose estimation problem, International Journal of Computer Vision, vol. 13, no. 3, pp. 331-356, 1994., D. G. Lowe: Fitting parameterized three-dimensional models to images, IEEE Transactions on PAMI, vol. 13, no. 5, pp. 441-450, 1991.)

Third Embodiment

In the first embodiment, the position of the simple prototype 300 is fixed. However, this embodiment will explain a case wherein when the observer holds the simple prototype 300, the position and orientation of the simple prototype 300 are changed and the angle of the movable part 301 can be arbitrarily changed. In such case, the same magnetic receiver as the magnetic receiver 201 is attached to the simple prototype 300.

Figure 8:
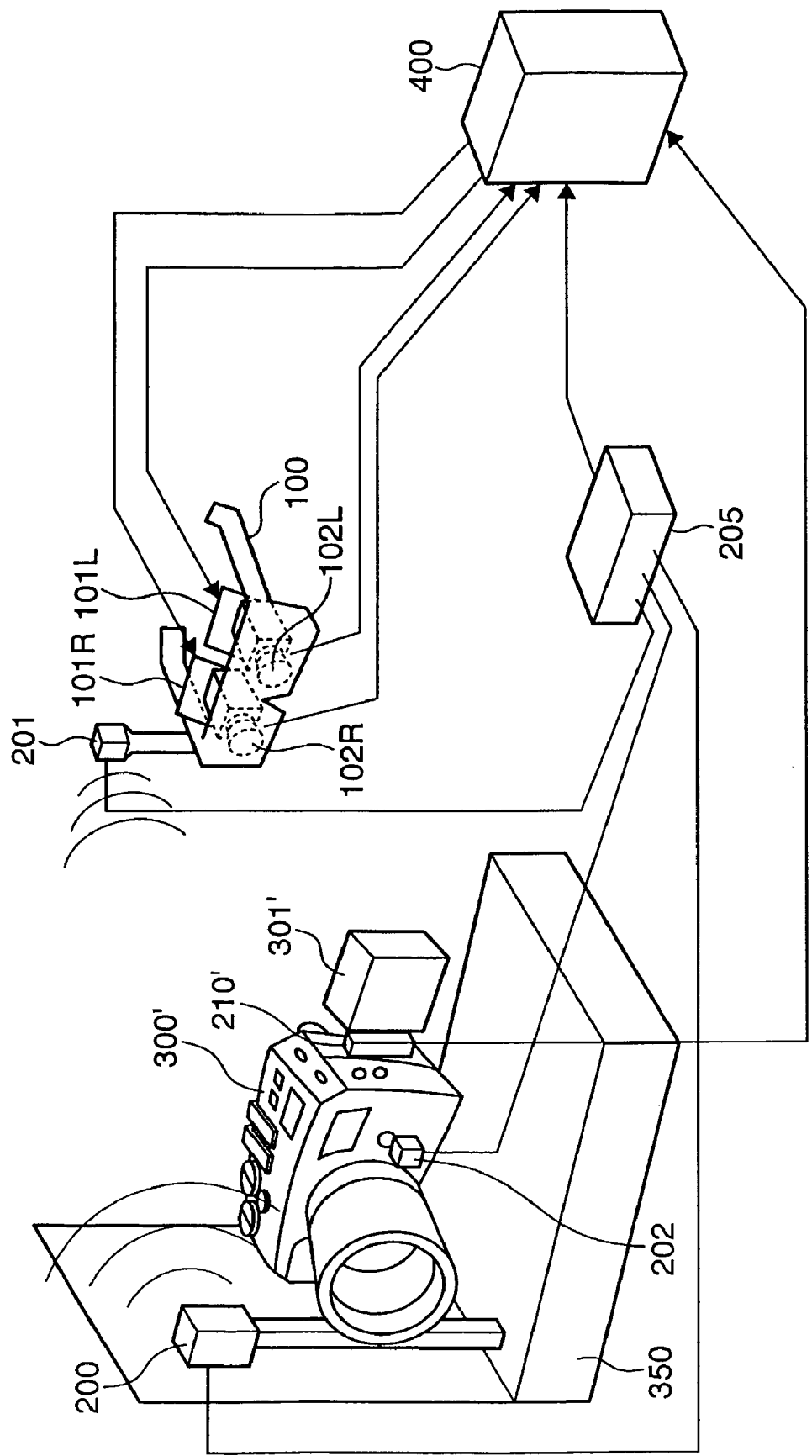
FIG. 8 is a view showing the outer appearance of a system which moves a movable part of the virtual object in correspondence with the movement of the movable part of the physical object according to the third embodiment of the present invention.

FIG. 8 is a view showing the outer appearance of a system which, when a virtual object that represents a physical object (simple prototype) having a movable part is superimposed on that physical object in the process of presenting an MR space obtained by superimposing a virtual space onto a physical space to the observer (user), moves a part corresponding to the movable part of the virtual object in correspondence with the movement of the movable part.

The same reference numerals in FIG. 8 denote the same parts as in FIG. 1, and a description thereof will be omitted. The difference of the arrangement in FIG. 8 from that of FIG. 1 is that a simple prototype (a camera in FIG. 8) 300', movable part 301', rotary encoder 210', and magnetic sensor (receiver) 202 are used in place of the simple prototype 300, movable part 301, and rotary encoder 210.

Reference numeral 300' denotes a simple prototype of a camera, which has a movable part 301'. As in the first embodiment, a rotary encoder 210' is attached to measure the rotation angle of the movable part 301'. Also, a magnetic sensor 202 is attached to measure the position and orientation of the simple prototype 300' on the sensor coordinate system.

Figure 9:
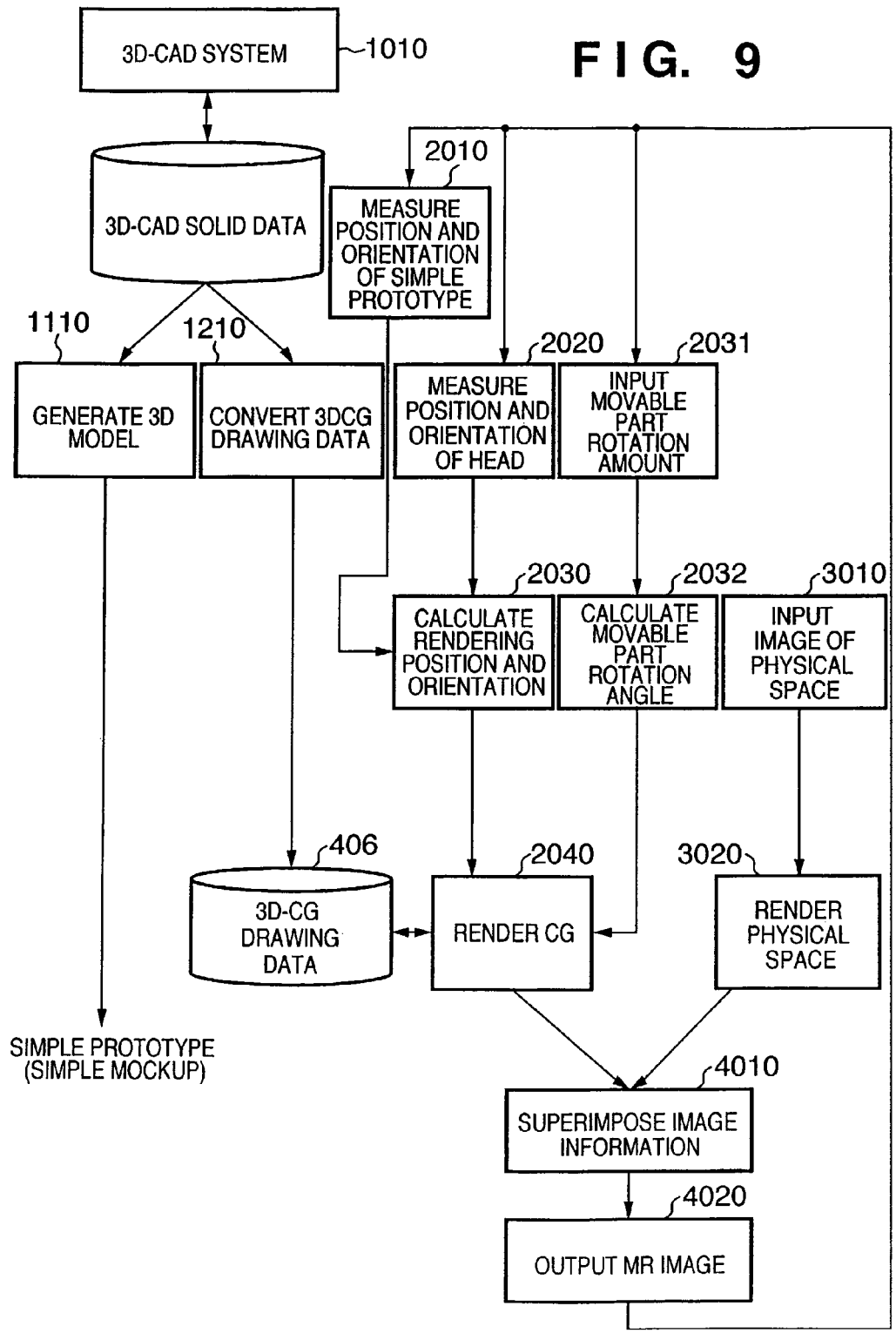
FIG. 9 is a chart showing the sequence of processing for presenting, to the right and left eyes of the observer, images of the MR space which are seen according to their positions and orientations according to the third embodiment of the present invention.

FIG. 9 is a chart showing the sequence of processing for presenting, to the right and left eyes of the observer, images of the MR space which are seen according to their positions and orientations. The same reference numerals in FIG. 9 denote the same processes as those in FIG. 4, and a description thereof will be omitted. The difference in the arrangement of FIG. 9 from that of FIG. 4 is that the position and orientation of the simple prototype 300' are measured in a process 2010.

More specifically, in the first embodiment, the predetermined position and orientation data of the simple prototype 300 are obtained by reading out them from the external storage device 1205. However, in this embodiment, these data are acquired from the sensor 202. Therefore, this embodiment is substantially the same as the first embodiment, except for the acquisition method of the position and orientation of the simple prototype 300 (300').

Fourth Embodiment

In this embodiment, the second and third embodiments are combined. More specifically, the simple prototype 300 comprises the magnetic sensor 202 to acquire its position and orientation if they are changed arbitrarily, and indices are arranged on the simple prototype 300 and movable part 301. In this way, in the system of the second embodiment, the measurement precision of the position and orientation of the viewpoint can be improved.

Figure 10:
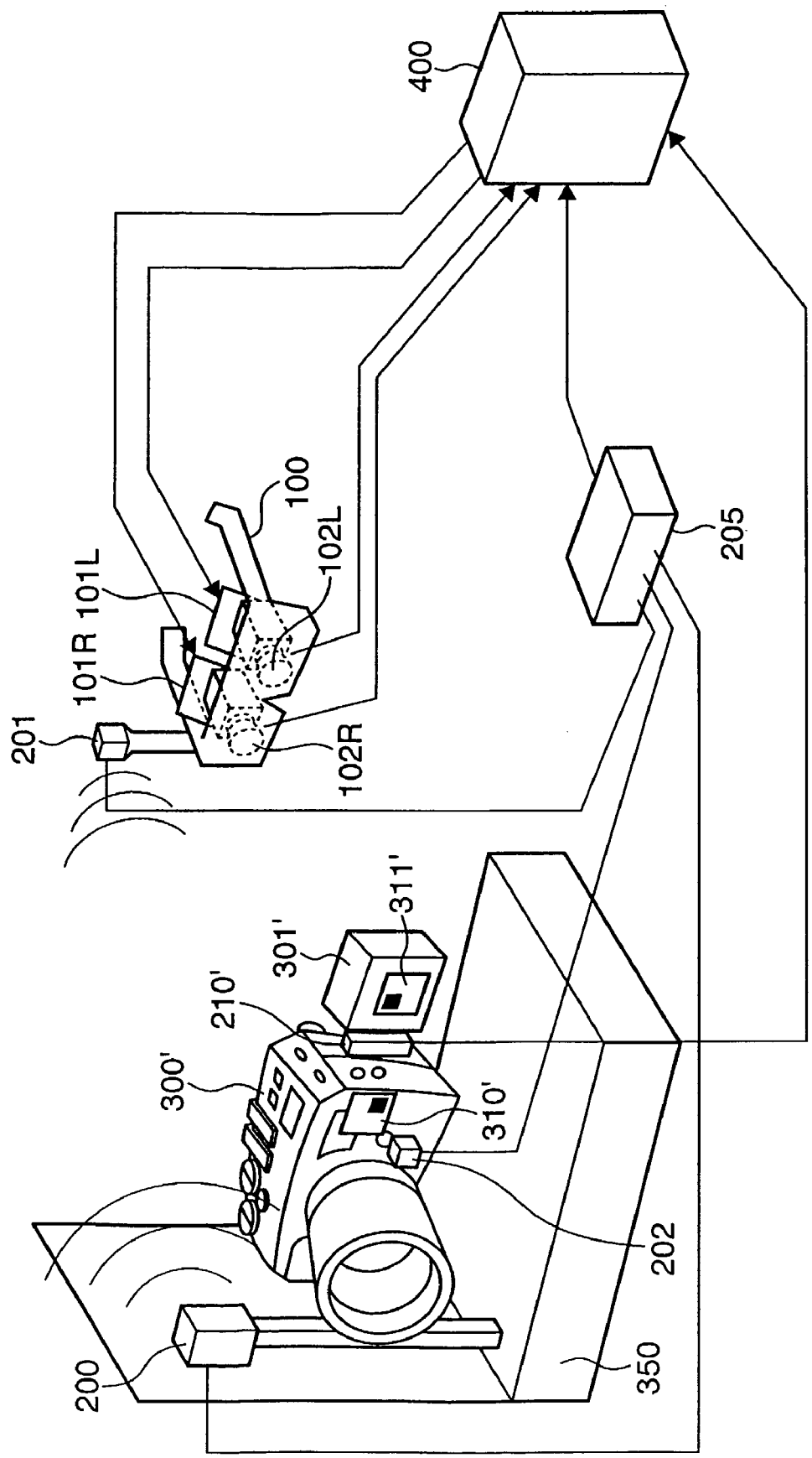
FIG. 10 is a view showing the outer appearance of a system which moves a movable part of the virtual object in correspondence with the movement of the movable part of the physical object according to the fourth embodiment of the present invention.

FIG. 10 is a view showing the outer appearance of a system which, when a virtual object that represents a physical object (simple prototype) having a movable part is superimposed on that physical object in the process of presenting an MR space obtained by superimposing a virtual space onto a physical space to the observer (user), moves a part corresponding to the movable part of the virtual object in correspondence with the movement of the movable part. The same reference numerals in FIG. 10 denote the same parts as those in FIGS. 1, 5, and 8, and a description thereof will be omitted. As shown in FIG. 10, the system arrangement uses those according to the second and third embodiments.

Figure 11:
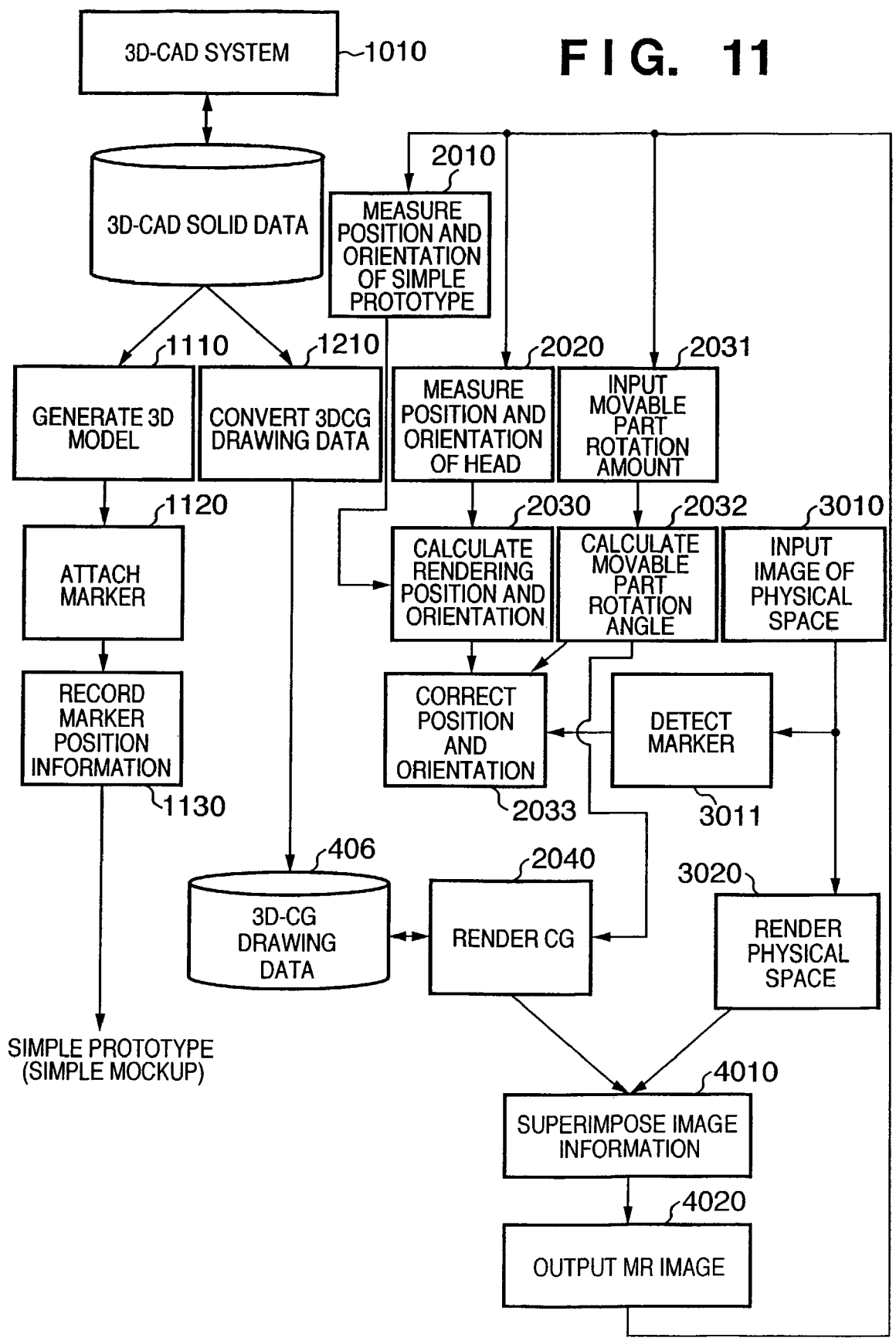
FIG. 11 is a chart showing the sequence of processing for presenting, to the right and left eyes of the observer, images of the MR space which are seen according to their positions and orientations according to the fourth embodiment of the present invention.

FIG. 11 is a chart showing the sequence of processing for presenting, to the right and left eyes of the observer, images of the MR space which are seen according to their positions and orientations. The same reference numerals in FIG. 11 denote the same parts as those in FIG. 4, and a description thereof will be omitted.

Note that a description according to the processing of this embodiment can be given by replacing the indices 310 and 311 by indices 310' and 311', and the simple prototype 300 and movable part 301 by the simple prototype 300' and movable part 301' in the descriptions of the second and third embodiments.

Other Embodiments

The objects of the present invention are also achieved by supplying a recording medium (or storage medium), which records a program code of software that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention.

The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer on the basis of an instruction of the program code, after the program code read out from the recording medium is written in a memory of the extension card or unit.

When the present invention is applied to the recording medium, that recording medium stores a program code corresponding to the aforementioned flowchart.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-123980 filed on Apr. 21, 2005, which is hereby incorporated by reference herein in its entirety.

The invention claimed is:

1. An image processing method for generating and outputting an image of a virtual space, comprising:
a first acquisition step of acquiring a position and orientation of a viewpoint of an observer;
an input step of inputting an image of a physical space which is seen from the observer viewpoint;
a second acquisition step of acquiring a position and orientation of a physical object having a movable part;
a movement acquisition step of acquiring a moving amount of the movable part of the physical object;
a moving step of moving a virtual movable part of a virtual object, corresponding to the movable part of the physical object, based on the moving amount;
a holding step of holding positions and/or orientations of indices, arranged on the physical object, in a holding unit;
a detection step of obtaining image coordinates of the indices arranged on the physical object from the image input in the input step;
a correction step of correcting the position and orientation of the viewpoint of the observer acquired in the first acquisition step using the image coordinates of indices obtained in the detection step and the positions and/or orientations of the indices held in the holding unit;
a generation step of generating an image which is seen when the virtual object, the virtual movable part of which is moved in the moving step, is observed from the observer viewpoint, based on the position and orientation of the viewpoint of the observer and the position and orientation of the physical object; and
an output step of outputting the image generated in the generation step while superimposing the generated image onto the image input in the input step.

2. The method according to claim 1, further comprising a management step of managing information associated with the indices arranged on the physical object using transformation information of coordinate systems; and
an updating step of updating the transformation information based on the moving amount acquired in the movement acquisition step,
a calculation step of calculating image coordinates of indices arranged on the physical object using the updated transformation information, and
wherein the correction step further comprises correcting the position and orientation of the viewpoint of the observer acquired in the first acquisition step using the image coordinates of indices obtained in the detection step and the image coordinates of the indices calculated in the updating step.

3. The method according to claim 2, wherein the transformation information of the coordinate systems includes first transformation information from a world coordinate system into a coordinate system of a stationary part of the physical object, and second transformation information from the coordinate system of the stationary part into a coordinate system of the movable part; and
wherein the updating step updates the second transformation information based on the moving amount acquired in the movement acquisition step, and calculates the image coordinates of the indices, in the world coordinate system, arranged on the physical object using the updated second transformation information and the first transformation information.

4. The method according to claim 1, wherein in the movement acquisition step the moving amount of the movable part is acquired by a device attached to the physical object.

5. The method according to claim 4, wherein the device attached to the physical object is a rotary or linear encoder.

6. The method according to claim 4, wherein the device attached to the physical object is a magnetic or optical measuring device.

7. An image processing apparatus for generating and outputting an image of a virtual space, wherein the apparatus is implemented with at least a processor and a memory, the apparatus comprising:
a first acquisition unit adapted to acquire a position and orientation of a viewpoint of an observer;
an input unit adapted to input an image of a physical space which is seen from the observer viewpoint;
a second acquisition unit adapted to acquire a position and orientation of a physical object having a movable part;
a movement acquisition unit adapted to acquire a moving amount of the movable part of the physical object;
a moving unit adapted to move a virtual movable part of a virtual object, corresponding to the movable part of the physical object, based on the moving amount;
a holding unit adapted to hold positions and/or orientations of indices, arranged on the physical object, in a holding unit;
a detection unit adapted to obtain image coordinates of the indices arranged on the physical object from the image input in the input unit; and
a correction unit adapted to correct the position and orientation of the viewpoint of the observer acquired in the first acquisition unit using the image coordinates of indices obtained in the detection unit and the positions and/or orientations of the indices held in the holding unit;
a generation unit adapted to generate an image which is seen when the virtual object, the virtual movable part of which is moved by the moving unit, is observed from the observer viewpoint, based on the position and orientation of the viewpoint of the observer and the position and orientation of the physical object; and an output unit adapted to output the image generated by said generation unit while superimposing that image onto the image input in the input unit.

8. A non-transitory computer-readable storage medium encoded with a computer program for generating and outputting an image of a virtual space in an image processing method, said computer program implementing the method comprising:

a first acquisition step of acquiring a position and orientation of a viewpoint of an observer;

an input step of inputting an image of a physical space which is seen from the observer viewpoint;

a second acquisition step of acquiring a position and orientation of a physical object having a movable part;

a movement acquisition step of acquiring a moving amount of the movable part of the physical object;

a moving step of moving a virtual movable part of a virtual object, corresponding to the movable part of the physical object, based on the moving amount;

a holding step of holding positions and/or orientations of indices, arranged on the physical object, in a holding unit;

a detection step of obtaining image coordinates of indices arranged on the physical object from the image input in the input step;

a correction step of correcting the position and orientation of the viewpoint of the observer acquired in the first acquisition step using the image coordinates of indices obtained in the detection step and the positions and/or orientations of the indices held in the holding unit;

a generation step of generating an image which is seen when the virtual object, the virtual movable part of which is moved in the moving step, is observed from the observer viewpoint, based on the position and orientation of the viewpoint of the observer and the position and orientation of the physical object; and an output step of outputting the image generated in the generation step while superimposing the generated image onto the image input in the input step.

* * * * *